(12) United States Patent
Kurasawa

(10) Patent No.: US 8,760,608 B2
(45) Date of Patent: Jun. 24, 2014

(54) LIQUID CRYSTAL DISPLAY PANEL

(75) Inventor: Hayato Kurasawa, Kanagawa (JP)

(73) Assignee: Japan Display West Inc., Chita-gun, Aichi-ken (JP)

( * ) Notice: Subject to any disclaimer, the term of this patent is extended or adjusted under 35 U.S.C. 154(b) by 82 days.

(21) Appl. No.: 12/986,513

(22) Filed: Jan. 7, 2011

(65) Prior Publication Data

US 2012/0176574 A1   Jul. 12, 2012

(51) Int. Cl.
*G02F 1/1343*   (2006.01)

(52) U.S. Cl.
USPC ............................. 349/141; 349/129; 349/142

(58) Field of Classification Search
USPC ......................................... 349/129, 141–142
See application file for complete search history.

(56) References Cited

U.S. PATENT DOCUMENTS

2007/0152939 A1* 7/2007 Kim et al. ................ 345/94
2009/0115712 A1* 5/2009 Morimoto et al. ......... 345/87

FOREIGN PATENT DOCUMENTS

JP   2005-196118   7/2005
JP   2009-115841   5/2009

OTHER PUBLICATIONS

Japanese Office Action issued Jul. 23, 2013 in corresponding Japanese Patent Application.

* cited by examiner

*Primary Examiner* — Phu Vu
(74) *Attorney, Agent, or Firm* — K&L Gates LLP

(57) ABSTRACT

A liquid crystal display panel includes: a pair of substrates opposed to each other with a liquid crystal layer interposed therebetween, one of the pair of substrates including a lower electrode; an upper electrode that is formed on the surface of the lower electrode with an insulating layer interposed therebetween and that has a plurality of slit-like apertures formed for each sub pixel; and an alignment film that is formed to cover the upper electrode and the surface of the insulating layer. The plurality of slit-like apertures are divided into a first slit-like aperture group including a plurality of slit-like apertures extending in a first direction and a second slit-like aperture group including a plurality of slit-like apertures extending in a second direction different from the first direction. The angles formed with a liquid crystal alignment direction in a voltage non-applied state by the first direction and by the second direction are different.

3 Claims, 7 Drawing Sheets

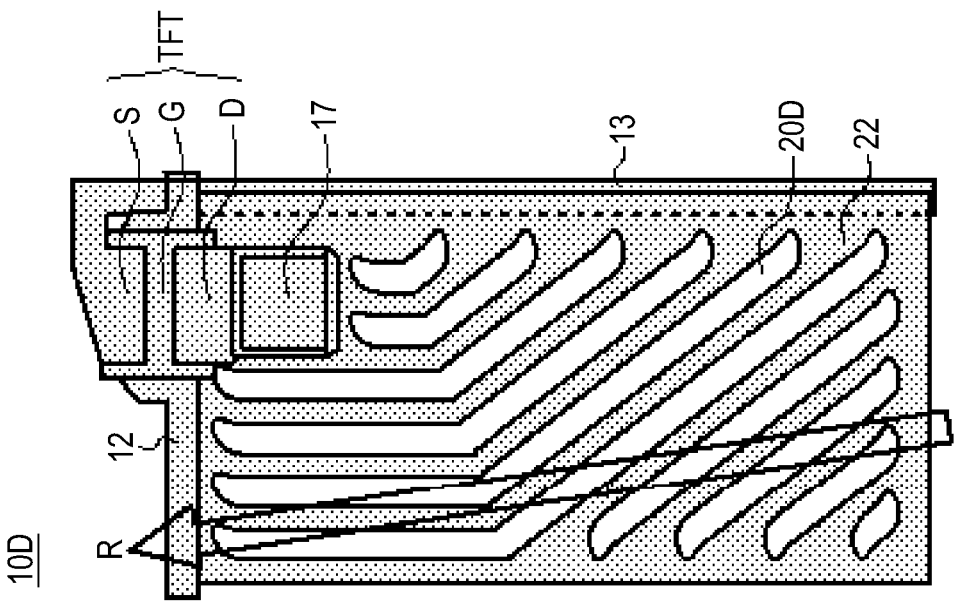
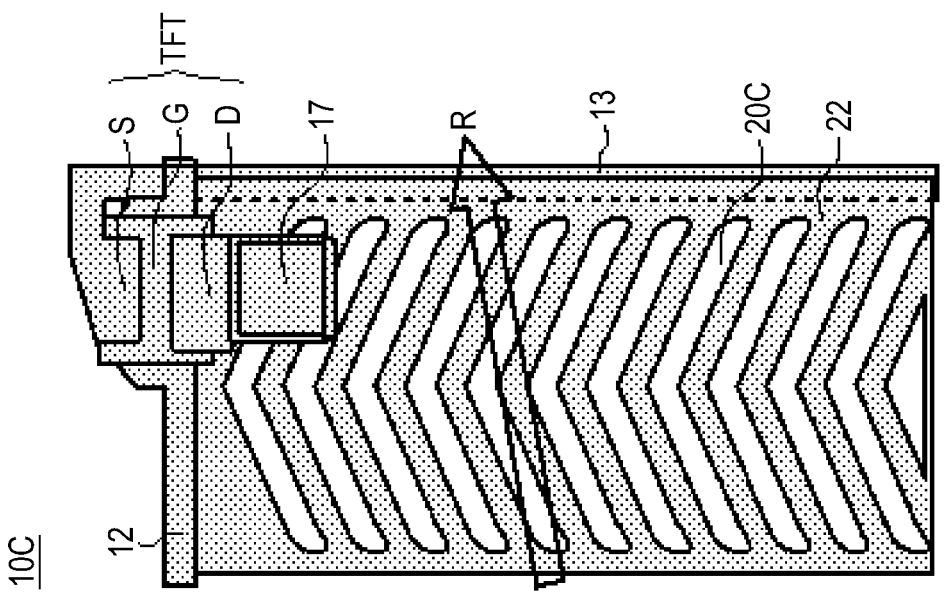

LIQUID CRYSTAL DISPLAY PANEL

CROSS REFERENCES TO RELATED APPLICATIONS

The present application contains subject matter related to that disclosed in Japanese Patent Application JP 2008-164547 filed in the Japan Patent Office on Jun. 24, 2008, the entire contents of which is hereby incorporated by reference.

BACKGROUND

The present application relates to a liquid crystal display panel of an FFS (Fringe Field Switching) mode, and more particularly, to a liquid crystal display panel of an FFS mode with a toneless and excellent viewing angle characteristic including slit-like apertures extending in plural directions.

A liquid crystal display panel has characteristics that it is smaller in weight, thickness, and power consumption than a CRT (Cathode Ray Tube) and thus is widely used in many electronic apparatuses for display. The liquid crystal display panel serves to change the direction of liquid crystal molecules aligned in a predetermined direction with an electric field by performing a rubbing process of an alignment film and to change an amount of transmitted or reflected light to display an image.

The methods of applying an electric field to liquid crystal of a liquid crystal display panel can be classified into a vertical electric field type and a horizontal electric field type. In the vertical electric field type of liquid crystal display panel, a roughly vertical electric field is applied to liquid crystal molecules by a pair of electrodes interposing a liquid crystal layer therebetween. Examples of such a vertical electric field type of liquid crystal display panel include liquid crystal panels of a TN (Twisted Nematic) mode, a VA (Vertical Alignment) mode, and an MVA (Multi-domain Vertical Alignment) mode. In the horizontal electric field type of liquid crystal display panel, a pair of electrodes is disposed on the inner surface of one of a pair of substrates interposing a liquid crystal layer therebetween so as to be insulated from each other and a roughly horizontal electric field is applied to liquid crystal molecules. Examples of such a horizontal electric field type of liquid crystal display panel include liquid crystal display panels of an IPS (In-Plane Switching) mode in which a pair of electrodes does not overlap with each other in a plan view and an FFS (Fringe Field Switching) mode in which a pair of electrodes overlaps with each other.

In the liquid crystal display panel of the FFS mode, a pair of electrodes including an upper electrode and a lower electrode is disposed in different layers with an insulating film interposed therebetween, a slit-like aperture is formed in the upper electrode, and a roughly horizontal electric field is applied to the liquid crystal molecules through the slit-like aperture. The liquid crystal display panel of an FFS mode has advantages such that it is possible to obtain a wide viewing angle and to improve image contrast, and thus is extensively used. However, in the horizontal electric field type of liquid crystal display panel, since a slit with a constant width is used in each sub pixel, there is a problem in that color attachment occurs depending on the viewing angle direction. In order to improve the viewing angle characteristic and to reduce the color attachment in the horizontal electric field type of liquid crystal display panel, an attempt to divide a rubbing direction into plural directions in each pixel has been tried (see JP-A-2005-196118). Here, the liquid crystal display panel disclosed in JP-A-2005-196118 will be described below with reference to FIG. 8.

FIG. 8 is a plan view schematically illustrating the configuration of a sub pixel in a horizontal electric field type of liquid crystal display panel disclosed in JP-A-2005-196118.

In the horizontal electric field type of liquid crystal display panel 50, the inside of one sub pixel is divided into four domains of IA, IIA, IIIB, and IVB and the angles formed with common electrodes 51a and 51b and pixel electrodes 52a and 52b which are driven by TFTs by the respective rubbing directions vary depending on the domains. In the liquid crystal display panel 50, four domains are formed by disposing the common electrodes 51a and 51b and the pixel electrodes 52a and 52b so as to be bent in the horizontal and vertical directions, and the rubbing direction is changed in domain A and domain B of one sub pixel so as to compensate for color conversion in the domains, thereby canceling the color attachment.

SUMMARY

In the above-mentioned horizontal electric field type of liquid crystal display panel 50 according to the related art, it can be expected to improve the viewing angle characteristic and to reduce the color attachment. However, the above-mentioned liquid crystal display panel 50 has a technical difficulty such that the rubbing direction in a small area of one sub pixel should be divided into plural directions. The above-mentioned liquid crystal display panel 50 also has a problem in that four domains having different color conversions are formed in one sub pixel because four multi-domains are formed by slit-like apertures with a constant width, thereby not obtaining an excellent display characteristic.

Thus, it is desirable to provide a liquid crystal display panel of an FFS mode with an excellent viewing angle characteristic and small color attachment.

According to an embodiment, there is provided a liquid crystal display panel having a pair of substrates opposed to each other with a liquid crystal layer interposed therebetween, one of the pair of substrates including: a lower electrode; an upper electrode that is formed on the surface of the lower electrode with an insulating layer interposed therebetween and that has a plurality of slit-like apertures formed for each sub pixel; and an alignment film that is formed to cover the upper electrode and the surface of the insulating layer. Here, the plurality of slit-like apertures are divided into a first slit-like aperture group including a plurality of slit-like apertures extending in a first direction and a second slit-like aperture group including a plurality of slit-like apertures extending in a second direction different from the first direction, and angles formed with a liquid crystal alignment direction in a voltage non-applied state by the first direction and by the second direction are different.

The liquid crystal display panel includes a pair of substrates opposed to each other with a liquid crystal layer interposed therebetween and one of the pair of substrates includes a lower electrode, an upper electrode that is formed on the surface of the lower electrode with an insulating layer interposed therebetween and that has a plurality of slit-like apertures formed for each sub pixel, and an alignment film that is formed to cover the upper electrode and the surface of the insulating layer. According to this configuration, the liquid crystal display panel can work in an FFS mode. In the liquid crystal display panel, the lower electrode may be formed on the surface of an interlayer film formed of a resin film or on the surface of a transparent substrate such as a glass substrate. In the liquid crystal display panel, any of the upper electrode and the lower electrode can serve as a pixel electrode or a common electrode. The insulating film formed on the surface of the lower electrode is formed of an inorganic insulating film such as silicon oxide or silicon nitride, and the silicon nitride can be preferably used from the viewpoint of electrical insulation. The upper electrode and the lower electrode can be formed of a transparent conductive material such as ITO (Indium Tin Oxide) or IZO (Indium Zinc Oxide).

In the liquid crystal display panel, the birefringence of liquid crystal varies with the variation in driving voltage and the light-transmitting rate accordingly varies. This characteristic is referred to as a voltage-transmittance (VT) characteristic. The amount of variation in light-transmitting rate of the liquid crystal display panel due to the variation in driving voltage varies depending on wavelengths of light, thereby causing a phenomenon called color attachment. In the liquid crystal display panel of an FFS mode, the VT characteristic varies depending on the angle formed by the length direction of the slit-like apertures of the upper electrode and the liquid crystal alignment direction in the voltage non-applied state. When a rubbing process is performed on the alignment film, the liquid crystal alignment direction in the voltage non-applied state is equal to the direction of the rubbing process.

In the liquid crystal display panel, the plurality of slit-like apertures are divided into the first slit-like aperture group including plural slit-like apertures extending in a first direction and the second slit-like aperture group including plural slit-like apertures extending in a second direction different from the first direction. By forming two slit-like aperture groups having different extending directions, areas (domains) having different alignment directions of liquid crystal molecules are formed in the slit-like aperture groups, respectively, thereby obtaining a wide viewing angle characteristic.

In the liquid crystal display panel, the angles formed with the liquid crystal alignment direction in a voltage non-applied state by the first direction of the first slit-like aperture group and by the second direction of the second slit-like aperture group are different. According to this configuration, since the angles formed by both sides in the length directions of the slit-like aperture groups and the liquid crystal alignment direction in the voltage non-applied state are different, the VT characteristic varies depending on the slit-like aperture groups. When the slit-like aperture groups have the different VT characteristics, the VT characteristics are superposed to exhibit the VT characteristic expressed by an envelope thereof, thereby obtaining a liquid crystal display panel with an excellent viewing angle characteristic hardly causing the color attachment.

In the liquid crystal display panel, the ends of the slit-like apertures in one of the first slit-like aperture group and the second slit-like aperture group may not be connected to the ends of the slit-like apertures in the other slit-like aperture group, and the slit-like apertures may be independently formed in the respective groups. When the liquid crystal alignment direction in the voltage non-applied state is equal in the first slit-like aperture group and the second slit-like aperture group, the first direction and the second direction should be different from each other. However, when the liquid crystal alignment direction in the voltage non-applied state varies depending on the first slit-like aperture group and the second slit-like aperture group, the first direction and the second direction may be equal to each other.

When the ends of the slit-like apertures in one of the first slit-like aperture group and the second slit-like aperture group are not connected to the ends of the slit-like apertures in the other slit-like aperture group, and the slit-like apertures are independently formed in the respective groups, the slit-like apertures can be arranged in a sub pixel with a high density. Therefore, according to this configuration, it is possible to provide a liquid crystal display panel with small unevenness in display image quality in a sub pixel.

In the liquid crystal display panel, the slit-like apertures of the first slit-like aperture group and the slit-like apertures of the second slit-like aperture group may be connected to each other at the ends of the slit-like apertures to form a "<" shape.

In the liquid crystal display panel of an FFS mode, since liquid crystal molecules at closed end portions of both ends of a slit-like aperture are not normally driven, the liquid crystal molecules are not used in display. However, when two slit-like aperture groups having different extending directions are connected at the ends of the slits to form a "<" shape, the number of closed end portions not used in display is reduced. Therefore, according to this configuration, it is possible to provide a liquid crystal display panel with a high aperture ratio capable of displaying a bright image.

When two slit-like apertures having different extending directions are connected to each other, domains having different alignment directions of liquid crystal molecules can communicate with each other. Accordingly, for example, when a press test or the like is carried out, the ripple failure which is a phenomenon such that an abnormally-aligned area remains in a side occurs. However, in the liquid crystal display panel according to an embodiment, since the angles formed with the liquid crystal alignment direction in the voltage non-applied state by the first direction of the first slit-like aperture group and by the second direction of the second slit-like aperture group are different, it is possible to obtain a tendency that the domains having different alignment directions of the liquid crystal molecules can easily incline to a side. Therefore, in the liquid crystal display panel according to an embodiment, since it is not difficult to form domains having different alignment directions of the liquid crystal molecules but the domains having different alignment directions of the liquid crystal molecules can incline to a side, the abnormally-aligned area resulting from the press test or the like can be made to be invisible.

In the liquid crystal display panel, the absolute value of a difference between an angle formed by the first direction and the liquid crystal alignment direction in the voltage non-applied state and an angle formed by the second direction and the liquid crystal alignment direction in the voltage non-applied state may be equal to or greater than 1° and less than 7°.

When the absolute value of the difference between the angle formed by the first direction and the liquid crystal alignment direction in the voltage non-applied state and the angle formed by the second direction and the liquid crystal alignment direction in the voltage non-applied state is less than 1°, a yellowish color appears at the time of displaying a halftone, which is not preferable. When the absolute value of the angle difference is equal to or greater than 7°, a vertically-striped or a horizontally-striped stain may be visible due to the difference in brightness between both sides of the boundary of the aligned domains in a sub pixel, which is not preferable.

In the liquid crystal display panel, the absolute value of a difference between an angle formed by the first direction and the liquid crystal alignment direction in the voltage non-applied state and an angle formed by the second direction and the liquid crystal alignment direction in the voltage non-applied state may be equal to or greater than 4° and equal to or less than 6°.

When the absolute value of the difference between the angle formed by the first direction and the liquid crystal alignment direction in the voltage non-applied state and the angle formed by the second direction and the liquid crystal alignment direction in the voltage non-applied state is equal to or greater than 4° and equal to or less than 6°, the above-mentioned advantage can be markedly obtained.

Additional features and advantages are described herein, and will be apparent from the following Detailed Description and the figures.

BRIEF DESCRIPTION OF THE FIGURES

FIG. 7A is a plan view illustrating the configuration of a sub pixel in a liquid crystal display panel according to Example 6 and FIG. 7B is a plan view illustrating the configuration of a sub pixel in a liquid crystal display panel according to Example 7.

DETAILED DESCRIPTION

Figure 1:
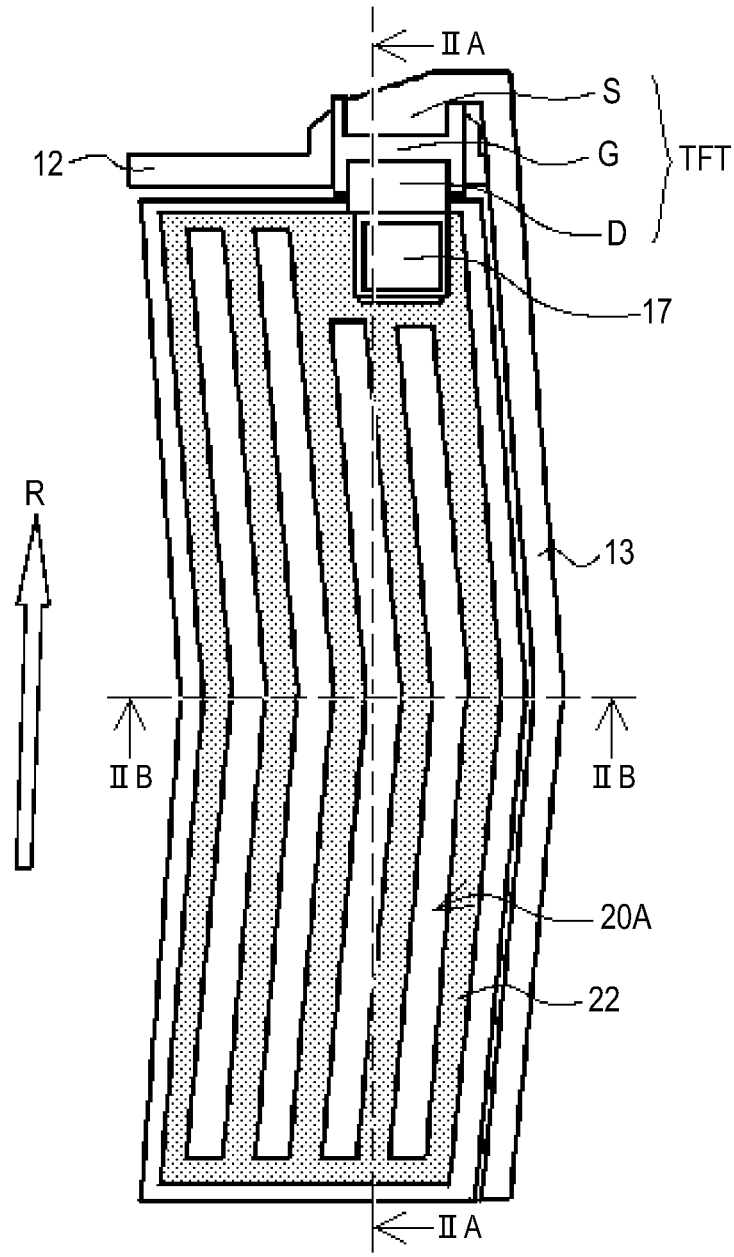
FIG. 1 is a plan view schematically illustrating the configuration of a sub pixel in a liquid crystal display panel of an FFS mode used in examples and comparative examples.

Embodiments of the present application will be described below in detail with reference to the drawings.

Here, while the below-described embodiments show examples embodying the technical spirit of the application, it is not intended to limit the application to an embodiments, and the application includes other embodiments within the scope of the claims. In the drawings used in describing the application, layers or members are illustrated with different scales so that the layers or the members are recognizable from the drawings, and are not proportionate to the actual sizes.

Figure 2B:
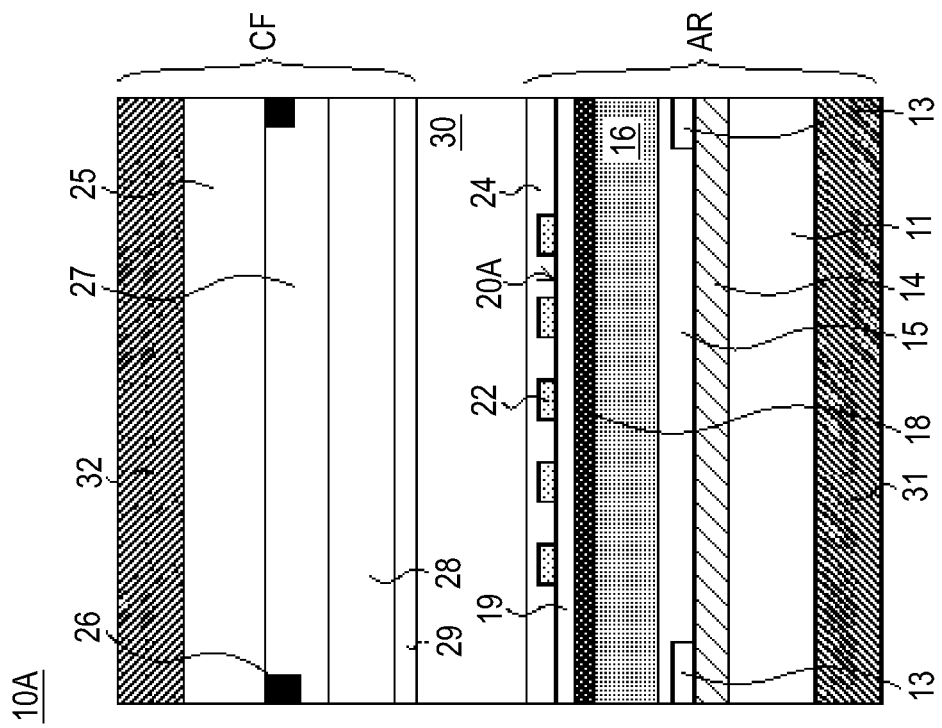
FIG. 2B is a sectional view taken along line IIB-IIB of FIG. 1.
Figure 2A:
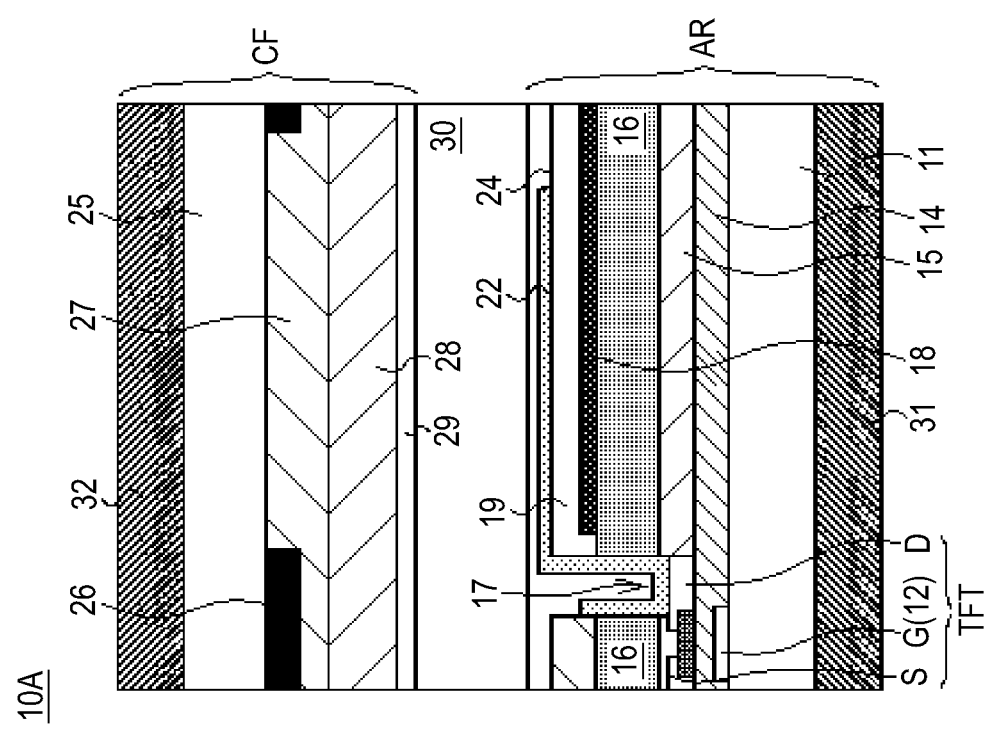
FIG. 2A is a sectional view taken along line IIA-IIA of FIG. 1.
Figure 3:
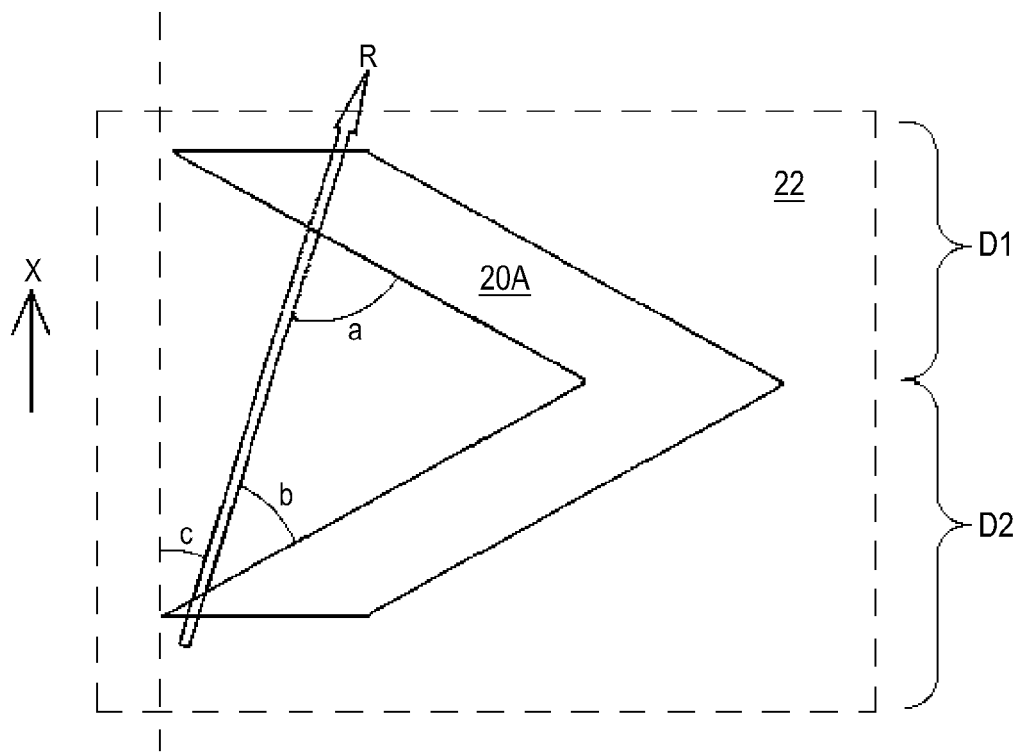
FIG. 3 is a diagram schematically illustrating the relation between angles of portions of a slit-like aperture shown in FIG. 1.
Figure 4:
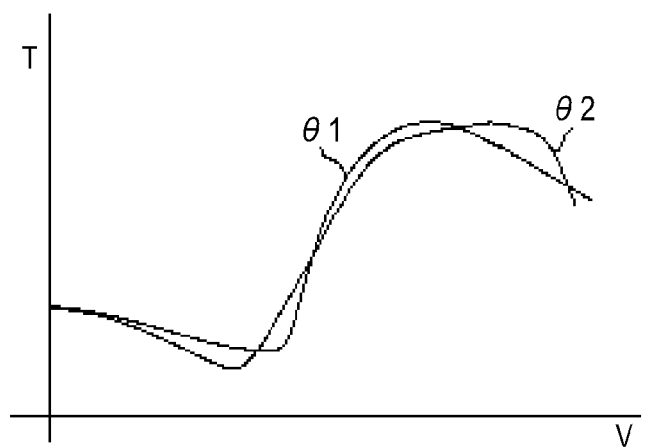
FIG. 4 is a graph illustrating the relation between an angle formed by a slit-like aperture and a liquid crystal alignment direction in a voltage non-applied state and the VT characteristic.
Figure 5:
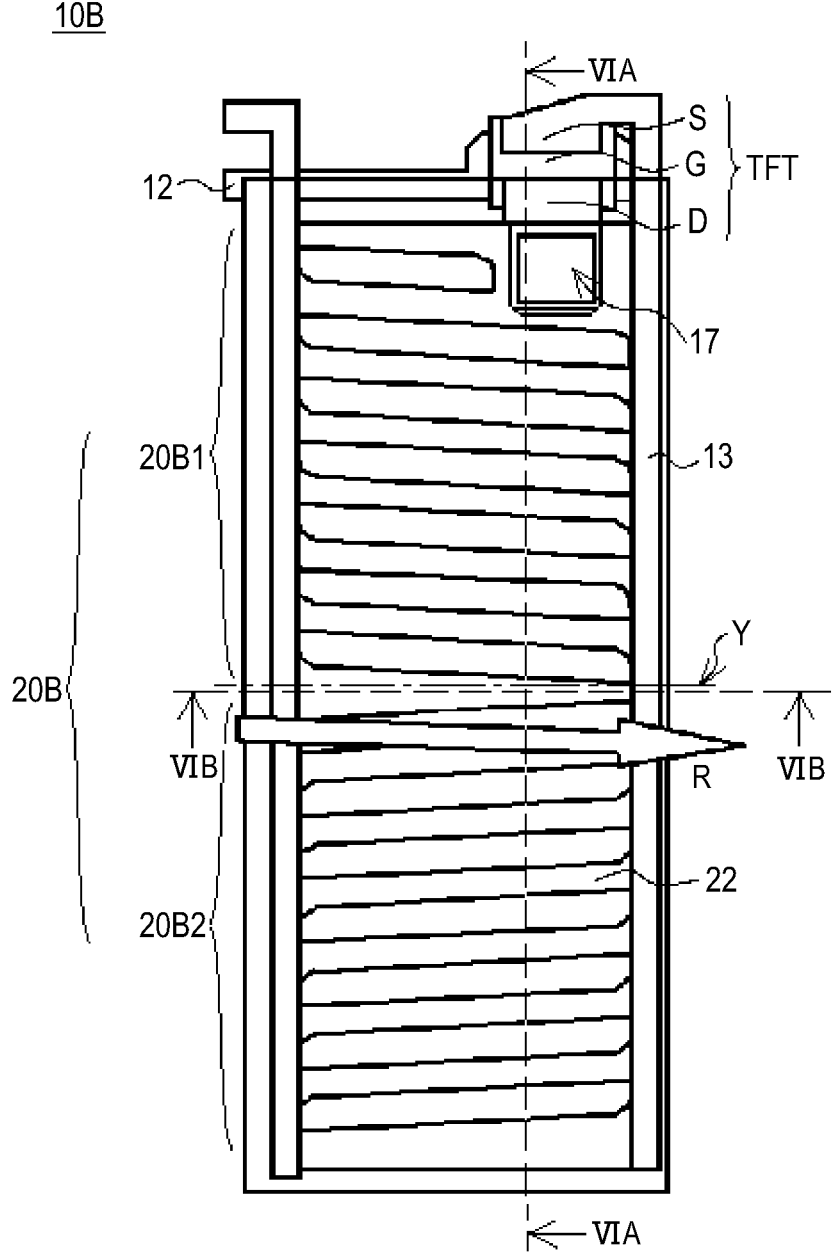
FIG. 5 is a plan view illustrating the configuration of a sub pixel in a liquid crystal display panel according to Example 5.
Figure 6A:
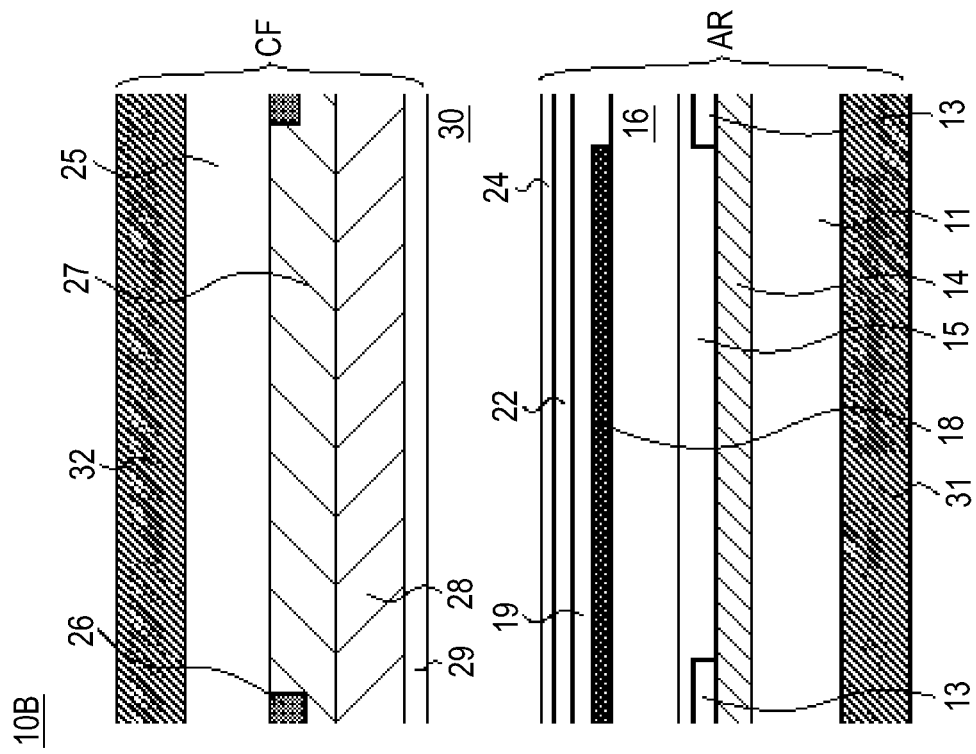
FIG. 6A is a sectional view taken along line VIA-VIA of FIG. 5.
Figure 6B:
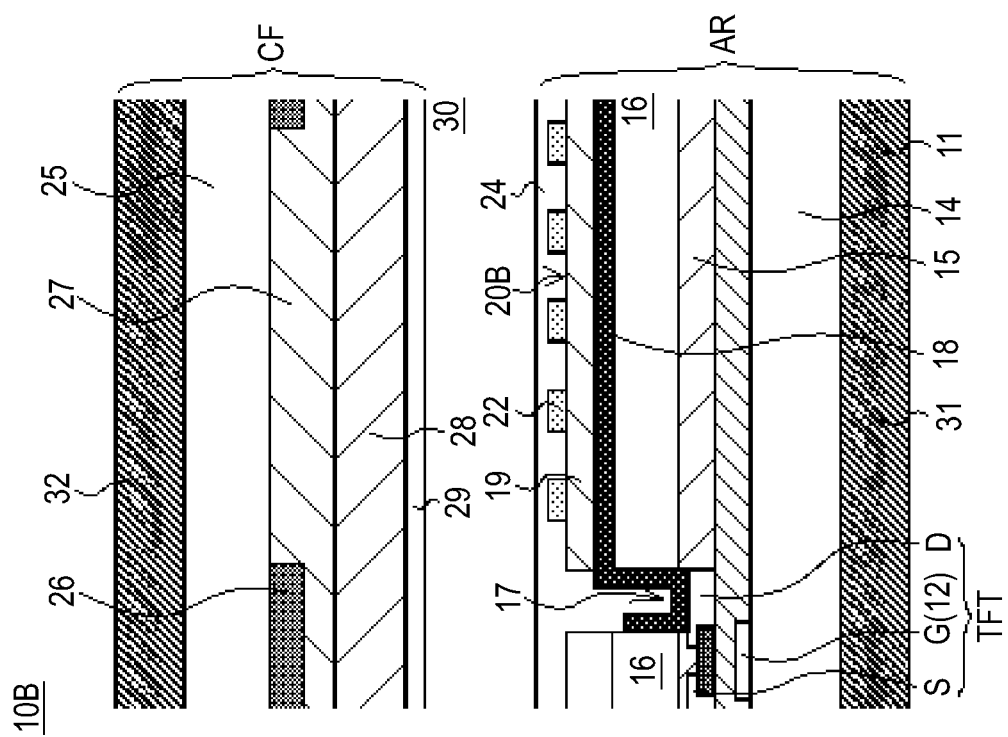
FIG. 6B is a sectional view taken along line VIB-VIB of FIG. 5.
Figure 8:
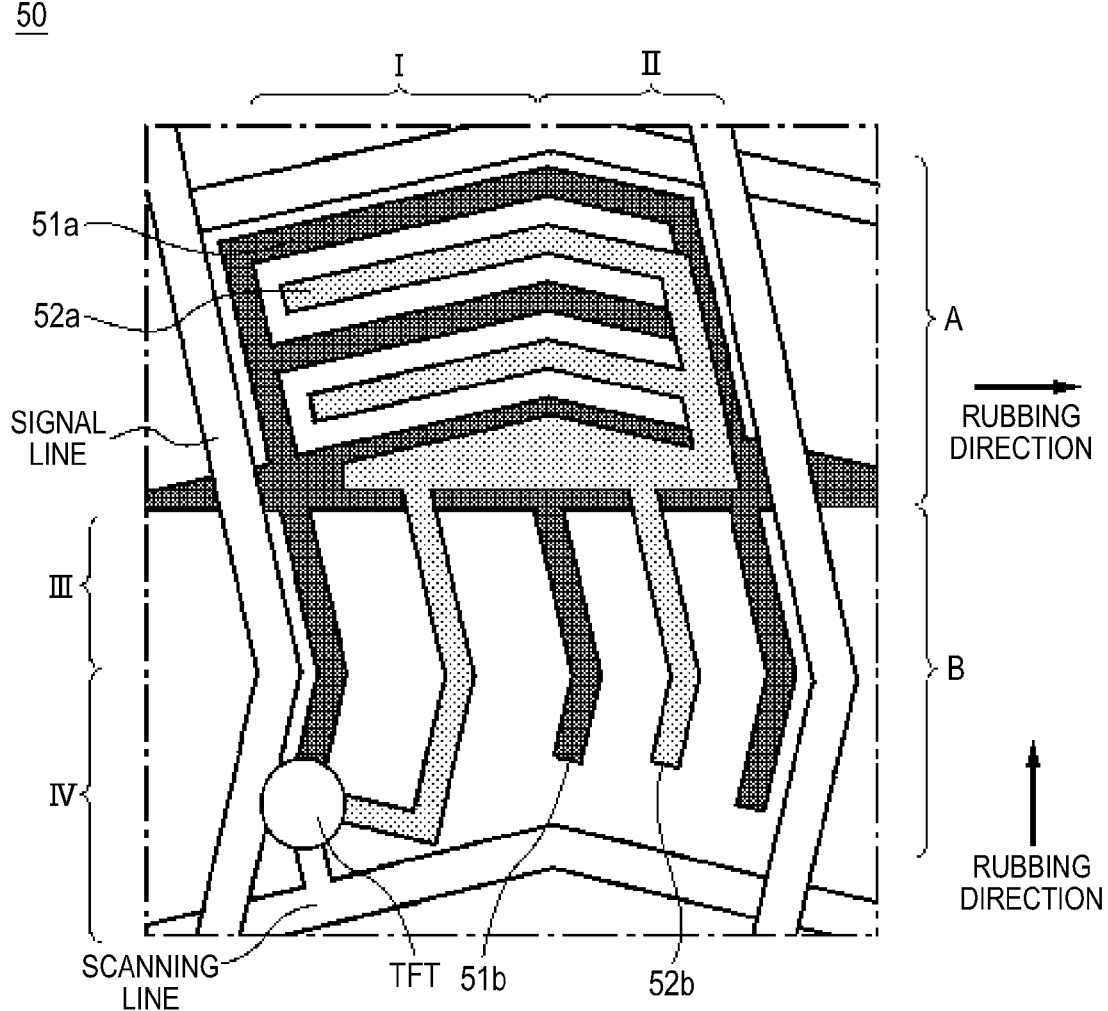
FIG. 8 is a plan view schematically illustrating the configuration of a sub pixel in a horizontal electric field type of liquid crystal display panel according to the related art.

FIG. 1 is a plan view illustrating the configuration of a sub pixel in a liquid crystal display panel of an FFS mode used in examples and comparative examples. FIG. 2A is a sectional view taken along line IIA-IIA of FIG. 1 and FIG. 2B is a sectional view taken along line IIB-IIB of FIG. 1. FIG. 3 is a diagram schematically illustrating the relation between angles of portions of a slit-like aperture shown in FIG. 1. FIG. 4 is a graph illustrating the relation between an angle formed by a slit-like aperture and a liquid crystal alignment direction in a voltage non-applied state and the VT characteristic. FIG. 5 is a plan view illustrating the configuration of a sub pixel in a liquid crystal display panel according to Example 5. FIG. 6A is a sectional view taken along line VIA-VIA of FIG. 5, and FIG. 6B is a sectional view taken along line VIB-VIB of FIG. 5. FIG. 7A is a plan view illustrating the configuration of a sub pixel in a liquid crystal display panel according to Example 6 and FIG. 7B is a plan view illustrating the configuration of a sub pixel in a liquid crystal display panel according to Example 7.

Examples 1 to 4 and Comparative Examples 1 to 4

First, in Examples 1 to 4 and Comparative Examples 1 to 4, the variation in display image quality was examined when the angles formed by the slit-like apertures extending in different directions and the liquid crystal alignment direction in a voltage non-applied state are changed. A liquid crystal display panel 10A common to Examples 1 to 4 and Comparative Examples 1 to 4 will be described with reference to FIGS. 1 to 3.

The liquid crystal display panel 10A includes an array substrate AR and a color filter substrate CF. In the array substrate AR, plural scanning lines 12 and plural signal lines 13 are formed in a matrix shape on the surface of a display area of a first transparent substrate 11 such as a glass substrate so as to intersect each other in a state where they are electrically isolated from each other with a gate insulating film 14. A common line (not shown) is formed in the peripheral edge of the display area. The respective areas surrounded with the scanning lines 12 and the signal lines 13 form a sub pixel. In the first transparent substrate 11, for example, a TFT is formed as a switching element in each pixel, and the entire surface of the first transparent substrate 11 including the TFT is covered with a passivation film 15 formed of, for example, a silicon nitride layer or a silicon oxide layer.

A planarization film 16 formed of an organic material is formed on the surface of the passivation film 15. A contact hole 17 is formed in the planarization film 16 and the passivation film 15 at the position corresponding to the drain electrode D of the TFT. A lower electrode 18 formed of a transparent conductive material such as ITO or IZO in a solid shape is formed on the surface of the planarization film 16, except for the area in which the TFT is formed and the area in which the contact hole 17 is formed. The lower electrode 18 is connected to the common line at the peripheral edge of the display area not shown and serves as a common electrode.

An insulating film 19 formed of a silicon nitride layer or a silicon oxide layer is formed on the entire surface of the first transparent substrate 11 on which the lower electrode 18 is formed. An upper electrode 22 formed of a transparent conductive material such as ITO or IZO is formed on the surface of the insulating film 19 for each sub pixel. Slit-like apertures 20A being bent in a "<" shape with a predetermined width are formed on the upper electrode 22. The details of the slit-like apertures 20A will be described later. The upper electrode 22 is electrically connected to the drain electrode D of the TFT via the contact hole 17 and serves as a pixel electrode. It is not particularly determined which of the upper electrode 22 and the lower electrode 19 should be connected to the drain electrode D of the TFT or the common line. A first alignment film 24 is formed on the entire display area including the surface of the upper electrode 22 and the insides of the slit-like apertures 20A. The alignment film 24 has been subjected to a rubbing process in a specific direction so as to align the liquid crystal molecules in the specific direction. The rubbing process corresponds to an example of a process of specifying the liquid crystal alignment direction in the voltage non-applied state in an embodiment.

In the color filter substrate CF, as shown in FIGS. 2A and 2B, a light-blocking film 26 is formed on the surface of a second transparent substrate 25 such as a glass substrate so as to cover the positions corresponding to the scanning line 12, the signal line 13, the contact hole 17, and the TFT in the array substrate AR. A color filter layer 27 of a predetermined color is formed on the surface of the second transparent substrate 25 surrounded with the light-blocking film 26. An overcoating layer 28 is formed to cover the surfaces of the light-blocking film 26 and the color filter layer 27. A second alignment film 29 is formed on the surface of the overcoating layer 28. The second alignment film 29 has been subjected to a rubbing process in a direction different from that of the first alignment film by 180°.

The array substrate AR and the color filter substrate CF are disposed so as to oppose the upper electrode 22 of the array substrate AR and the color filter layer 27 of the color filter substrate CF to each other and a liquid crystal 30 is enclosed therebetween. A first polarizing plate 31 and a backlight unit (not shown) are disposed outside the array substrate AR and a second polarizing plate 32 is disposed outside the color filter substrate CF, whereby the liquid crystal display panels 10A used in Examples 1 to 4 and Comparative Examples 1 to 4 are completed.

Here, the relations of the angles of the parts of one slit-like aperture 20A in the liquid crystal display panels 10A used in Examples 1 to 4 and Comparative Examples 1 to 4 will be described with reference to FIG. 3. The slit-like aperture 20A has a "<" shape of which the inside angle is an obtuse angle in FIG. 1, but is shown in a "<" shape of which the inside angle is an acute angle in FIG. 3 so as to clarify the relations of the angles. In the slit-like aperture 20A having a "<" shape, it is assumed that the part extending to the upper-left side in FIG. 3 belongs to a first slit-like aperture group D1 and the part extending to the lower-left side belongs to a second slit-like aperture group D2. The widths of the slit-like apertures in the first slit-like aperture group D1 and the second slit-like aperture group D2 are equal to each other similarly to the related art. In FIG. 3, an arrow X shown in the vertical direction represents the column direction of the liquid crystal display panel 10A and an inclined uncolored arrow represents the liquid crystal alignment direction R in the voltage non-applied state. Here, when it is assumed that the angle formed by the alignment direction R and the first slit-like aperture group D1 is a, the angle formed by the alignment direction R and the second slit-like aperture group D2 is b, the angle formed by the arrow X and the alignment direction is c, and the clockwise direction in the angles a to c is positive (+), the following expression is satisfied.

$$|a-b|=2|c|$$

In the liquid crystal display panels 10A used in Examples 1 to 4 and Comparative Examples 1 to 4, by keeping the "<" shape of the slit-like apertures 20A constant and variously changing the liquid crystal alignment direction R in the voltage non-applied state, eight liquid crystal display panels having various values of a and b were manufactured and the colors of the liquid crystal display panels were evaluated by eye. The results are shown in Table 1.

TABLE 1

| | a (°) | b (°) | |a − b| (°) | c (°) | effect |
|---|---|---|---|---|---|
| Comparative Example 1 | 5.0 | 5.0 | 0.0 | 0 | yellowish in halftone |
| Comparative Example 2 | 8.2 | 7.8 | 0.4 | 0.2 | " |
| Example 1 | 5.5 | 4.5 | 1.0 | 0.5 | yellowish in halftone is slightly improved |
| Example 2 | 11.0 | 9.0 | 2.0 | 1.0 | yellowish in halftone is slightly improved |
| Example 3 | 7.0 | 3.0 | 4.0 | 2.0 | yellowish in halftone is markedly improved |
| Example 4 | 10.0 | 4.0 | 6.0 | 3.0 | yellowish in halftone is markedly improved |
| Comparative Example 3 | 10.5 | 3.5 | 7.0 | 3.5 | horizontal stripe is visible due to vertical |
| Comparative Example 4 | 11.0 | 3.0 | 8.0 | 4.0 | brightness difference in sub pixel horizontal stripe is visible |

The following can be seen from the results shown in Table 1. That is, when |a−b| is less than 1° (Comparative Examples 1 and 2), a yellowish color is visible at the time of displaying a halftone. When |a−b| is equal to or greater than 7° (Comparative Examples 3 and 4), a difference in brightness occurs between the first slit-like aperture group D1 and the second slit-like aperture group D2 and a horizontally-striped stain is visible between the first slit-like aperture group D1 and the second slit-like aperture group D2. When |a−b| is equal to or greater than 1° (Examples 1 and 2), the yellowish color tone in the halftone is improved. When |a−b| is equal to or greater than 4° (Examples 3 and 4), the effect is greater. An excellent effect can be obtained until |a−b| is equal to 6° (Example 4), but the difference in brightness slowly becomes visible between the first slit-like aperture group D1 and the second slit-like aperture group D2 when |a−b| is greater than 6°. When |a−b| is equal to 7° (Comparative Example 3), a horizontally-striped stain due to the difference in brightness between the first slit-like aperture group D1 and the second slit-like aperture group D2 can be seen. Therefore, in the range of 1°≤|a−b|<7°, it is possible to provide a liquid crystal display panel with small color attachment and excellent display image quality. In the range of 4'≤|a−b|<6°, more preferable results can be obtained.

The reason for such results is as follows. That is, in the liquid crystal display panel, as known as the voltage-transmittance (VT) characteristic, the birefringence of the liquid crystal varies with the variation in driving voltage and the light-transmitting rate varies as a result. The variation in light-transmitting rate due to the variation in driving voltage causes a phenomenon, color attachment, because the amount of variation varies depending on the wavelength of light. In the liquid crystal display panel of an FFS mode, the VT characteristic varies depending on the angle formed by the length direction of the slit-like apertures of the upper electrode and the liquid crystal alignment direction in the voltage non-applied state. This relation is shown in FIG. 4. That is, curves θ1 and θ2 shown in FIG. 4 represent VT curves when the angles a and b (see FIG. 3) formed by the slit-like apertures and the liquid crystal alignment direction in the voltage non-applied state are θ1 and θ2, respectively.

In this way, when plural VT characteristics are obtained in a sub pixel, the VT characteristic exhibited by an envelope in which the plural VT characteristics are superposed is visible to a viewer and the color in the halftone is compensated for. Accordingly, it is possible to provide a liquid crystal display panel with an excellent viewing angle characteristic hardly causing color attachment.

As described above, when two types of slit-like apertures 20A having different extending directions are connected in a "<" shape, the domains, which are formed by the first slit-like aperture group D1 and the second slit-like aperture group D2, having different alignment directions of the liquid crystal molecules can incline to each other. Therefore, when a press test or the like is carried out on the liquid crystal display panels 10A according to the examples, the ripple failure that an abnormally-aligned area remains in one side may occur. However, in the liquid crystal display panels 10A according to the examples, since the first direction and the second direction of the first slit-like aperture group D1 and the second slit-like aperture group D2 form different angles with the liquid crystal alignment direction in the voltage non-applied state, it is possible to obtain a tendency that the domains having different liquid crystal alignment directions can easily incline to one side. Therefore, in the liquid crystal display panel according to the examples, since it is not difficult to generate the domains having different alignment directions of the liquid crystal molecules but the domains having different alignment directions of the liquid crystal molecules can be made to incline to a side, the abnormally-aligned area resulting from the press test or the like can be made to be invisible.

Example 5

Although two slit-like apertures 20A having different extending directions are connected in a "<" shape in the liquid crystal display panels 10A according to Examples 1 to 4 and Comparative Examples 1 to 4, plural slit-like apertures 20B having different extending directions are individually formed in a liquid crystal display panel 10B according to example 5. The liquid crystal display panel 10B according to Example 5 will be described with reference to FIG. 5 and FIGS. 6A and 6B. Here, the liquid crystal display panel 10B has the same configuration as the liquid crystal display panels 10A according to Examples 1 to 4 and Comparative Examples 1 to 4, except that the slit-like apertures 20B have a different configuration and the lower electrode 18 and the upper electrode 22 are used as the pixel electrode and the common electrode, respectively. Therefore, in FIG. 5 and FIGS. 6A and 6B, the same elements as those of the liquid crystal display panels 10A according to Examples 1 to 4 and Comparative Examples 1 to 4 are referenced by like reference numerals and signs and the details thereof are not described.

In the liquid crystal display panel 10B according to Example 5, two types of slit-like apertures 20B1 and 20B2 having different extending directions are arranged symmetric about a perpendicular line Y at the center in the column direction of one sub pixel. The liquid crystal alignment direction in the voltage non-applied state is oblique to the perpendicular line Y as indicated by an uncolored arrow R in FIG. 5. In the liquid crystal display panel 10B according to Example 5, the angle formed by the slit-like aperture 20B1 and the liquid crystal alignment direction R in the voltage non-applied state is set to 2° and the angle formed by the slit-like aperture 20B2 and the liquid crystal alignment direction R in the voltage non-applied state is set to 8°. By employing the liquid crystal display panel 10B according to Example 5, it is also possible to provide a liquid crystal display panel with an excellent viewing angle characteristic hardly causing color attachment, similarly to the liquid crystal display panels according to Examples 1 to 4.

By employing the configuration of the liquid crystal display panel 10B according to Example 5, since the liquid crystal layer is not normally driven at the closed end portions formed at both ends of the slit-like apertures 20B1 and 20B2, the portions may not be used for display, but the slit-like apertures can be arranged in a sub pixel with a high density. Accordingly, by employing the liquid crystal display panel 10B according to Example 5, it is possible to provide a liquid crystal display panel with small unevenness in display image quality in a sub pixel.

Examples 6 and 7

In the liquid crystal display panels 10A according to Examples 1 to 4, two slit-like apertures having different extending directions are connected in a "<" shape and the "<"-shaped slit-like apertures extend along the signal lines. However, the same advantages can be obtained in the case where the "<"-shaped slit-like apertures extend along the scanning lines and in the case where extend in a direction oblique to the signal lines. The case (Example 6) where the "<"-shaped slit-like apertures 20C extend along the scanning lines is shown in FIG. 7A and the case (Example 7) where the "<"-shaped slit-like apertures 20D extend in the direction oblique to the signal lines is shown in FIG. 7B. Liquid crystal display panels 10C and 10D according to Examples 6 and 7 are the same as the liquid crystal display panels 10A according to Examples 1 to 4 and Comparative Examples 1 to 4, except for the configurations of the slit-like apertures 20C and 20D. Therefore, in FIGS. 7A and 7B, the same elements as those of the liquid crystal display panels 10A according to Examples 1 to 4 and Comparative Examples 1 to 4 are referenced by the same reference numerals and signs and the details thereof are not described.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. A liquid crystal display panel comprising:
 a pair of substrates opposed to each other with a liquid crystal layer interposed therebetween, one of the pair of substrates including a lower electrode;
 an upper electrode that is formed on the surface of the lower electrode with an insulating layer interposed therebetween and that has a plurality of slit-like apertures formed for each sub pixel; and
 an alignment film that is formed to cover the upper electrode and the surface of the insulating layer,
 wherein the plurality of slit-like apertures are divided into a first slit-like aperture group including a plurality of slit-like apertures extending in a first direction, and a second slit-like aperture group including a plurality of slit-like apertures extending in a second direction different from the first direction, and
 wherein angles formed by a liquid crystal alignment direction in a voltage non-applied state by the first direction and by the second direction are different, and
 wherein the absolute value of a difference between an angle formed by the first direction and the liquid crystal alignment direction in the voltage non-applied state and an angle formed by the second direction and the liquid crystal alignment direction in the voltage non-applied state is equal to or greater than 4° and less than 6°.
2. The liquid crystal display panel according to claim 1, wherein the ends of the slit-like apertures in one of the first slit-like aperture group and the second slit-like aperture group are not connected to the ends of the slit-like apertures in the other slit-like aperture group, and the slit-like apertures are independently formed in the respective groups.
3. The liquid crystal display panel according to claim 1, wherein the slit-like apertures of the first slit-like aperture group and the slit-like apertures of the second slit-like aperture group are connected to each other at the ends of the slit-like apertures to form a "<" shape.

* * * * *